United States Patent [19]

Tooth

[11] Patent Number: 4,632,359
[45] Date of Patent: Dec. 30, 1986

[54] LOW NOISE FLOW CONTROL VALVE
[75] Inventor: Allan D. Tooth, Penshurst, Australia
[73] Assignee: International Combustion Australia Limited, New South Wales, Australia
[21] Appl. No.: 718,116
[22] Filed: Apr. 1, 1985
[51] Int. Cl.⁴ .............................................. F16K 47/02
[52] U.S. Cl. .................................. 251/126; 181/269; 181/280; 138/43
[58] Field of Search .............. 251/126, 117; 138/43; 137/625.3; 181/269, 280

[56] References Cited
U.S. PATENT DOCUMENTS

| | | | |
|---|---|---|---|
| 738,131 | 9/1903 | Weaver | 251/126 X |
| 2,303,590 | 12/1942 | Towler et al. | 251/126 X |
| 2,434,215 | 1/1948 | Mayer | 138/43 X |
| 2,568,123 | 9/1951 | Goldberg | 138/43 |
| 3,143,145 | 8/1964 | Kauss | 138/43 |
| 4,044,992 | 8/1977 | Jukoff | 251/126 |
| 4,479,509 | 10/1984 | Dear et al. | 137/625.3 |

FOREIGN PATENT DOCUMENTS 1958844 7/1970 Fed. Rep. of Germany ... 137/625.3

Primary Examiner—Arnold Rosenthal
Attorney, Agent, or Firm—Ladas & Parry

[57] ABSTRACT

A fluid control valve assembly having a threaded bore within which is located a spool having an end bluff surface and a threaded peripheral surface, the valve has a body with an entry passage communicating with a tapered chamber which delivers fluid to the bore by means of cage passages, said chamber, cage passages and bore all being tuned to frequencies well above the range of the human ear.

6 Claims, 3 Drawing Figures

LOW NOISE FLOW CONTROL VALVE

This invention relates to fluid control valves which can be drip tight with low noise emission and low leakage.

Valves for control of fluids whether air, oil, water, gas or steam control valves as currently used, can take many forms for example globe or gate valves. Where an on-off control of fluid only is required then globe valves are normally used. In high pressure fluid control applications the pressure reduction necessary for control of fluid flow is achieved by increasing the fluid velocity over the seat of the valve or through passages formed in the valve body or cage assembly.

Resulting from this high velocity is damaging erosion of valve parts or the valve internals have to be enlarged to accommodate many individual restrictions to the fluid flow to provide the desired pressure drop.

When control of flow is achieved by use of high velocities in valve body considerable noise is generated. This is especially the case with gases when critical pressure drop is required of about half the inlet pressure. In this case the gas must achieve sonic velocity with resultant high noise generation.

It is the object of the present invention to overcome or substantially ameliorate the above disadvantages.

There is disclosed herein a fluid control valve assembly comprising a body; a cylindrical bore in said body extending to an outlet; an entry passage extending to said bore; a spool extending longitudinally into said bore so as to have an end portion located therein, said end portion providing a bluff end face and a threaded section formed on a longitudinal peripheral surface of spool adjacent said face; a chamber formed in said entry passage and adapted to resonate at a predetermined frequency; a plurality of inner passages extending between said chamber and bore, at least one of said inner passages being tuned to resonate at a frequency close to said predetermined frequency, a further one of said end passages being located upstream of said one inner passage so as to deliver fluid to said threaded section so that the fluid delivered thereto is caused to spin; and wherein said outlet is tuned to a frequency close to said predetermined frequency.

A preferred form of the present invention will now be described by way of example with reference to the accompanying drawings, wherein.

In the preferred forms of the invention to be described with reference to the accompanying drawings, means is adopted to prevent generation of noise audible to the human ear by providing a means of trapping the sound produced in a particular chamber using tuned components and a series of screw threads to excite the flow in the valve in such a way as to separate the various components and prevent the escape of noise from the valve. It has also been found that this can be achieved whilst still maintaining high pressure drops without the effects of erosion.

More particularly, the preferred forms of the present invention employ three sections of the valve, which sections are used to tune out the sound produced by dropping fluid pressure. Each section is tuned to a high frequency, typically the inlet section is tuned to 30,000 hertz, the second (cage) section to 35,000 hertz, and the outlet section to 40,000 hertz. All these frequencies are well above the range of the human ear.

The first section produces a standing wave in the valve inlet. The second section consists of a series of cage holes with the depth thereof predetermined so as to be tuned to a specific frequency close to the frequency of the first section. The third section is defined in the valve outlet.

Figure 1:
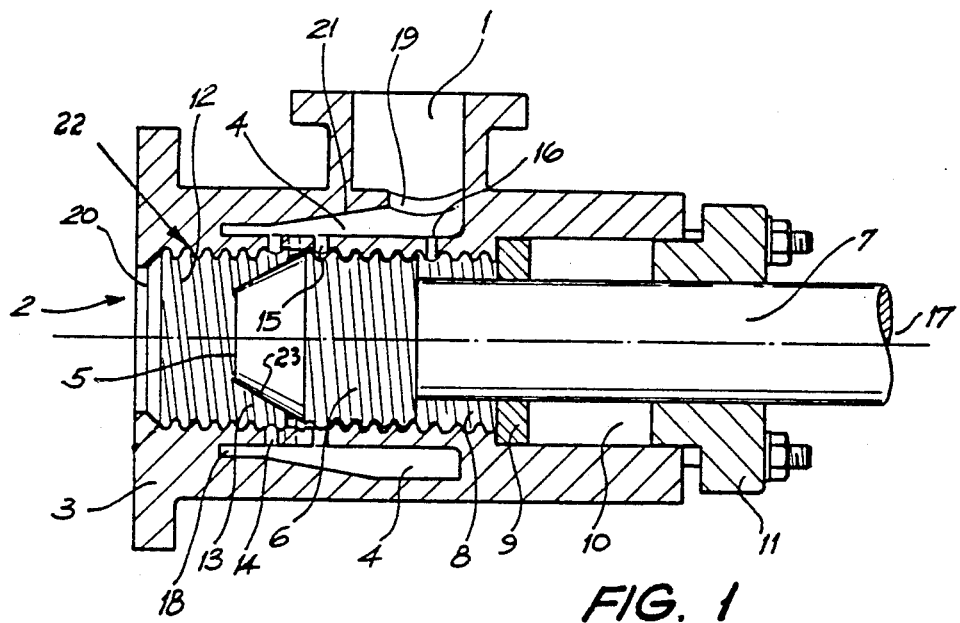
FIG. 1 is a schematic part-sectioned side elevation of a spool valve.
Figure 2:
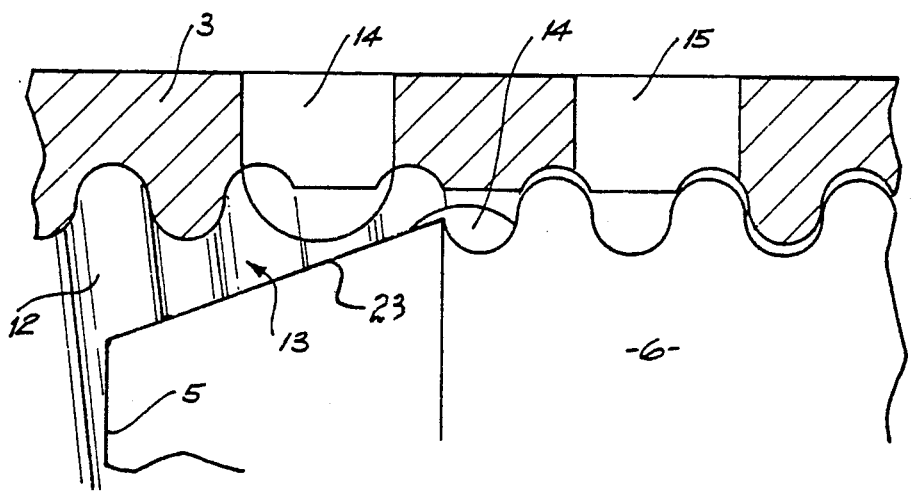
FIG. 2 is a schematic part-sectioned side elevation of a portion of the spool valve of FIG. 1.

Turning now to FIGS. 1 and 2, wherein there is schematically depicted a spool valve. The spool valve has a body 3 provided with a generally cylindrical bore 22. Extending into the bore 22 is a spool 7 having a threaded section 6 and an end bluff surface 5 joined to the threaded section 6 by means of a generally frusto-conical surface 23. The end 17 of the spool 7, would be provided with means enabling rotation of the spool 7 to move the spool 7 longitudinally of its axis. The frusto-conical surface 23 is adapted to engage the seat 20 in order to close the valve. Surrounding the spool 7 is a gland retainer 9 and a gland packing 10 and a gland follower 11.

The body 3 is provided with an inlet 1 communicating with an annular cavity 4 by means of a passage 19. The annular cavity 4 is tapered by being partly defined by a frusto-conical surface 21. More particularly, the chamber 4 terminates in a blind passage 18 which provides a standing wave. The chamber 4 maintains the fluid at a constant velocity entering the cage passages 14 which communicate with the bore 22. There is a plurality of the passages 14, with the passages 14 being located at angularly and longitudinally spaced locations along the bore 22. There is further provided passages 15 which are located upstream of the passages 14. A third set of passages 16 are provided in order to balance the pressure between the outlet 2 and the cavity 8 to ensure constant loading on the spool 7.

The bore 20 is threaded so as to be provided with threads 12 which co-operate with the threaded section 6 of the spool 7.

It should be appreciated that the chamber 4 forms a first section which would be tuned to approximately 3,000 hertz. A second section is provided by the passages 14, with the passages 14 being tuned to approximately 35,000 hertz. A third section is provided by the threaded outlet 2 with outlet 2 being tuned to approximately 40,000 hertz.

It should further be appreciated that by rotation of the spool 7, the threaded section 6 will move longitudinally of the bore 22 in order to expose one or more of the passages 14.

Still further it should be appreciated that fluid entering the bore 22 via the passages 16 is caused to spin via the threaded section 6. This fluid engaged by the threaded section 6 engages the fluid entering the bore 22 via the passages 14 at approximately 90°. The fluid then continues to spin in the cavity 13 until the bluff face 5 induces eddies to bounce from the threads 12 until the valve outlet 2 is reached.

The depth of the holes 14 is a function of the velocity of sound in the fluid medium, and are tuned to resonate at a frequency close to the frequency of the chamber 4.

When the above-described preferred embodiment is applied to a simple single seat glow valve, pressure reductions of 1,000 kpa to 300 kpa result in the generation of noise in the vicinity of 107 DBA.

Figure 3:
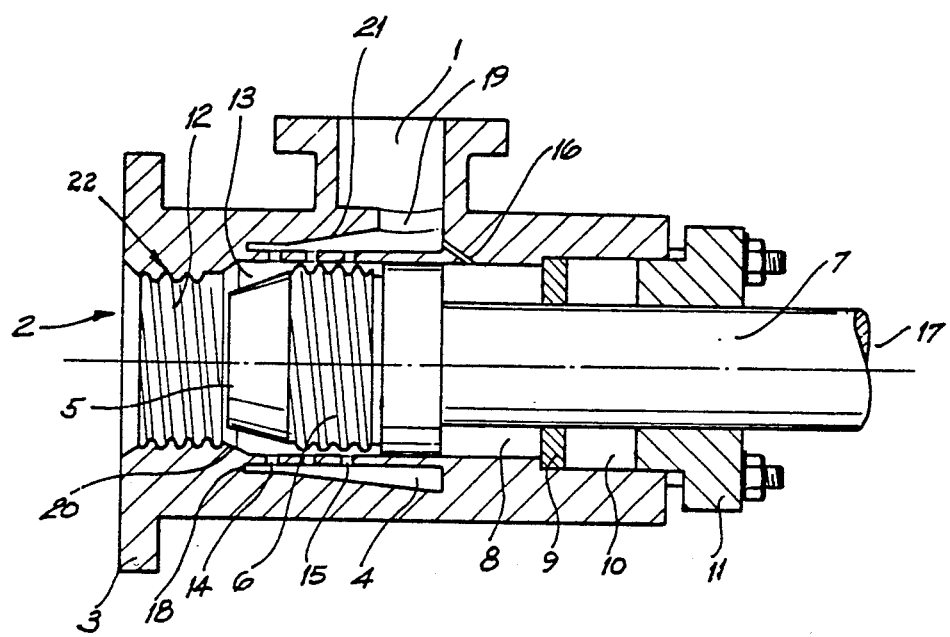
FIG. 3 is a schematic part-sectioned side elevation of a further spool valve.

In FIG. 3 there is schematically depicted a modification of the valve described with reference to FIGS. 1 and 2. However, the threaded section 6 has been modified relative to the bore 22. It should be noted that the threaded section 6 is no longer threadably engaged with the bore 22.

What I claim is:

1. A fluid control valve assembly comprising a body; a cylindrical bore in said body extending to an outlet; an entry passage extending to said bore; a spool extending longitudinally into said bore so as to have an end portion located therein, said end portion providing a bluff end face and a threaded section formed on a longitudinal pheripheral surface of spool adjacent said face; a chamber formed in said entry passage and adapted to resonate at a predetermined frequency, said chamber terminating in a blind passage which provides a standing wave; a plurality of inner passages extending between said chamber and bore, at least one said inner passages being tuned to resonate at a frequency close to said predetermined frequency, a further one of a said end passages being located upstream of said one inner passage so as to deliver fluid to said threaded section so that the fluid delivered thereto is caused to spin; and wherein said outlet is tuned to a frequency close to said predetermined frequency.

2. The fluid control valve assembly of claim 1, wherein said threaded section is threadably engaged with said bore.

3. The fluid control valve assembly of claim 1, wherein said threaded section is not threadably engaged with said cylindrical bore.

4. A fluid control valve assembly according to claim 1, wherein said bluff face is joined to said threaded section by means of a frusto-conical surface.

5. A fluid control valve assembly according to claim 1, wherein said chamber tapers so that the cross-sectional area thereof decreases in the direction of flow of fluid through the valve assembly.

6. The fluid control valve assembly of claim 1 wherein said entry passage is tuned to a frequency about 30,000 Hertz, said inner passage is tuned to a frequency about 35,000 Hertz, and said outlet is tuned to a frequency about 40,000 Hertz.

* * * * *